(12) United States Patent
Markel (10) Patent No.: US 7,526,723 B2
(45) Date of Patent: Apr. 28, 2009

(54) SYSTEM AND METHOD FOR EMULATING ENHANCED AND INTERACTIVE STREAMING MEDIA DELIVERY

(75) Inventor: Steven O. Markel, Highlands Ranch, CO (US)

(73) Assignee: Intellocity USA Inc., San Francisco, CA (US)

( * ) Notice: Subject to any disclaimer, the term of this patent is extended or adjusted under 35 U.S.C. 154(b) by 530 days.

(21) Appl. No.: 10/347,656

(22) Filed: Jan. 16, 2003

(65) Prior Publication Data

US 2003/0142127 A1  Jul. 31, 2003

Related U.S. Application Data

(63) Continuation-in-part of application No. 09/941,246, filed on Aug. 27, 2001, now Pat. No. 6,791,579.

(60) Provisional application No. 60/227,918, filed on Aug. 25, 2000, provisional application No. 60/348,873, filed on Jan. 16, 2002.

(51) Int. Cl.
*G06F 3/00* (2006.01)
(52) U.S. Cl. .................. 715/719; 715/721; 715/723
(58) Field of Classification Search .............. 715/738, 715/719, 721, 723
See application file for complete search history.

(56) References Cited

U.S. PATENT DOCUMENTS

| | | | | |
|---|---|---|---|---|
| 5,675,752 | A * | 10/1997 | Scott et al. ................. | 715/866 |
| 6,128,013 | A * | 10/2000 | Prabhu et al. ............... | 715/707 |
| 6,154,771 | A * | 11/2000 | Rangan et al. .............. | 709/217 |
| 6,201,538 | B1 * | 3/2001 | Wugofski .................... | 715/716 |
| 6,320,600 | B1 | 11/2001 | Smith et al. ................. | 345/723 |
| 6,560,777 | B2 * | 5/2003 | Blackketter et al. ......... | 725/110 |
| 2001/0002345 | A1 | 5/2001 | Oshima ...................... | 439/266 |
| 2001/0023450 | A1 | 9/2001 | Chu ............................ | 709/231 |
| 2001/0026637 | A1 | 10/2001 | Lelong et al. ............... | 382/128 |
| 2002/0026637 | A1 | 2/2002 | Markel et al. ................ | 725/37 |
| 2002/0087986 | A1 | 7/2002 | Markel ........................ | 725/42 |
| 2002/0103920 | A1 | 8/2002 | Berkun et al. ............... | 709/231 |
| 2002/0104096 | A1 * | 8/2002 | Cramer et al. .............. | 725/113 |
| 2002/0112247 | A1 | 8/2002 | Horner et al. ............... | 725/112 |
| 2002/0116708 | A1 | 8/2002 | Morris et al. ................ | 725/37 |
| 2002/0138844 | A1 | 9/2002 | Otenasek et al. ............ | 725/87 |

* cited by examiner

*Primary Examiner*—Boris Pesin
(74) *Attorney, Agent, or Firm*—Schwegman, Lundberg & Woessner, P.A.

(57) ABSTRACT

A media player, as may be employed in conjunction with a streaming media enhancement authoring application, is embedded in a browser window. A software program, operable to detect and extract information describing enhancements contained within an enhanced streaming media file and operable to generate HTML or other browser enhancement code to render the enhancements within the browser window as the enhanced streaming media file is played, is also embedded in the browser. The software program may be further operable, in response to enhancement information contained in a streaming media file, to pause a streaming media presentation, open a separate browser window, display a streaming media advertisement in the window, close the window, and resume display of the streaming media presentation. An editor is employed to perform any changes and the modified enhancement may be again viewed prior to viewing a next enhancement.

8 Claims, 4 Drawing Sheets

SYSTEM AND METHOD FOR EMULATING ENHANCED AND INTERACTIVE STREAMING MEDIA DELIVERY

CROSS REFERENCE TO RELATED APPLICATIONS

This application is a continuation-in-part of U.S. patent application Ser. No. 09/941,246 entitled "METHOD OF ENHANCING STREAMING MEDIA CONTENT", filed Aug. 27, 2001 now U.S. Pat. No. 6,791,579 by Steven O. Markel, that claims the benefit of U.S. provisional application Ser. No. 60/227,918 entitled "METHOD OF ENHANCING STREAMING MEDIA CONTENT", filed Aug. 25, 2000 by Steven O. Markel, both of which are specifically incorporated herein by reference for all that they disclose and teach.

This application also claims benefit of U.S. provisional patent application No. 60/348,873 entitled "SYSTEM AND METHOD FOR EMULATING ENHANCED AND INTERACTIVE STREAMING MEDIA DELIVERY" filed Jan. 16, 2002 by Steven O. Markel and specifically incorporates this application for all that it discloses and teaches.

BACKGROUND OF THE INVENTION a. Field of the Invention

The present invention pertains generally to video production authoring and more specifically to editing and review of edited enhancements for streaming media presentations.

b. Description of the Background

A streaming media program may be accompanied by additional information employed to enhance the program or to provide viewer interaction. Enhancements may include a wide range of information including captioning, multilingual support, advertising, and links through which a viewer may obtain additional information, for example. Enhancements may further include stock updates, news stories, Internet links, weather forecasts, bulletins, statistics, and trivia. For example, a football game may include icons allowing viewing of team players, statistics, trivia and other information such as upcoming games.

Enhanced television content may employ a combination of HTML (hypertext markup language), JavaScript, Java and other formats common to Internet page display. An enhanced display may comprise text, icons, graphics and images placed at locations on or in proximity to the television image. To produce an enhanced display, an author may create an enhancement file identifying each displayed object (such as text, icons, graphics and images), the location where each object is displayed, and the time at which the object may be displayed.

When enhancements are created, it is desirable that they may be reviewed to assure that a desired result has been achieved. In the related art, the practice of editing a program and then viewing the completed enhanced streaming media file over a closed Internet connection results in an awkward and time consuming process. The editing process may be more efficiently accomplished if enhancements are viewed as they are created, allowing the author to focus on one task at a time rather than view enhancements later with the necessary recall of the desired result. Therefore a new method for editing and previewing streaming media enhancements that provides convenient editing and previewing without Internet transmission is needed.

SUMMARY OF THE INVENTION

The present invention overcomes the disadvantages and limitations of the prior art by providing a system and method that allows non-linear previewing and modification of enhanced streaming media files in a near real-time manner without requiring Internet transmission.

The invention may therefore comprise a method of reviewing an enhanced streaming media presentation comprising: opening a browser window containing an embedded media player and a browser based enhancement parser program in a graphical user environment; opening an enhanced streaming media file containing enhancement information; playing the enhanced streaming media file; parsing the enhanced streaming media file using browser based enhancement parser program to extract the enhancement information; generating browser enhancement code using the browser based enhancement parser program employing the enhancement information; and executing the browser enhancement code within the browser to render an enhancement.

The present invention may further comprise a system for reviewing enhanced streaming media presentations comprising: a CPU; a display device; a user input device; a graphical user interface; a browser disposed in the graphical user interface; a media player embedded in the browser; and a browser based enhancement parser program embedded in the browser that extracts trigger information from the enhanced streaming media presentation and generates browser enhancement code to render an enhancement within the browser, the program further determining that if an enhancement is a streaming media advertisement, pausing the enhanced streaming media presentation, displaying the streaming media advertisement, and resuming display of the enhanced streaming media presentation.

Advantageously, the present invention provides preview of authored enhancements in an interactive manner, allowing enhancements to be verified and corrected as necessary as they are created, simplifying the review process and allowing for increased productivity and reduced development cost. For example, a laptop or desktop computer may be employed to author and preview enhancements employing the present invention. In contrast to broadcasting an enhanced streaming media file over a closed Internet network to preview enhancements, the present invention allows faster non-linear preview and correction, reducing development time and equipment requirements.

DESCRIPTION OF THE FIGURES

In the figures.

DETAILED DESCRIPTION OF THE INVENTION

Enhanced streaming media may comprise images, text, graphics and sounds that are rendered in conjunction with a streaming media presentation. The enhancements may employ HTML, JavaScript, Java and other coding technologies. The type and nature of enhancement and the time of display may employ an editor and methods as disclosed in U.S. patent application Ser. No. 09/941,246 entitled "METHOD OF ENHANCING STREAMING MEDIA CONTENT", filed Aug. 27,2001 by Steven O. Markel. Once enhancements have been defined, the enhanced presentation may be reviewed to confirm that the desired enhancement result has been achieved. Editing and review have historically been performed in a sequential manner.

Figure 1:
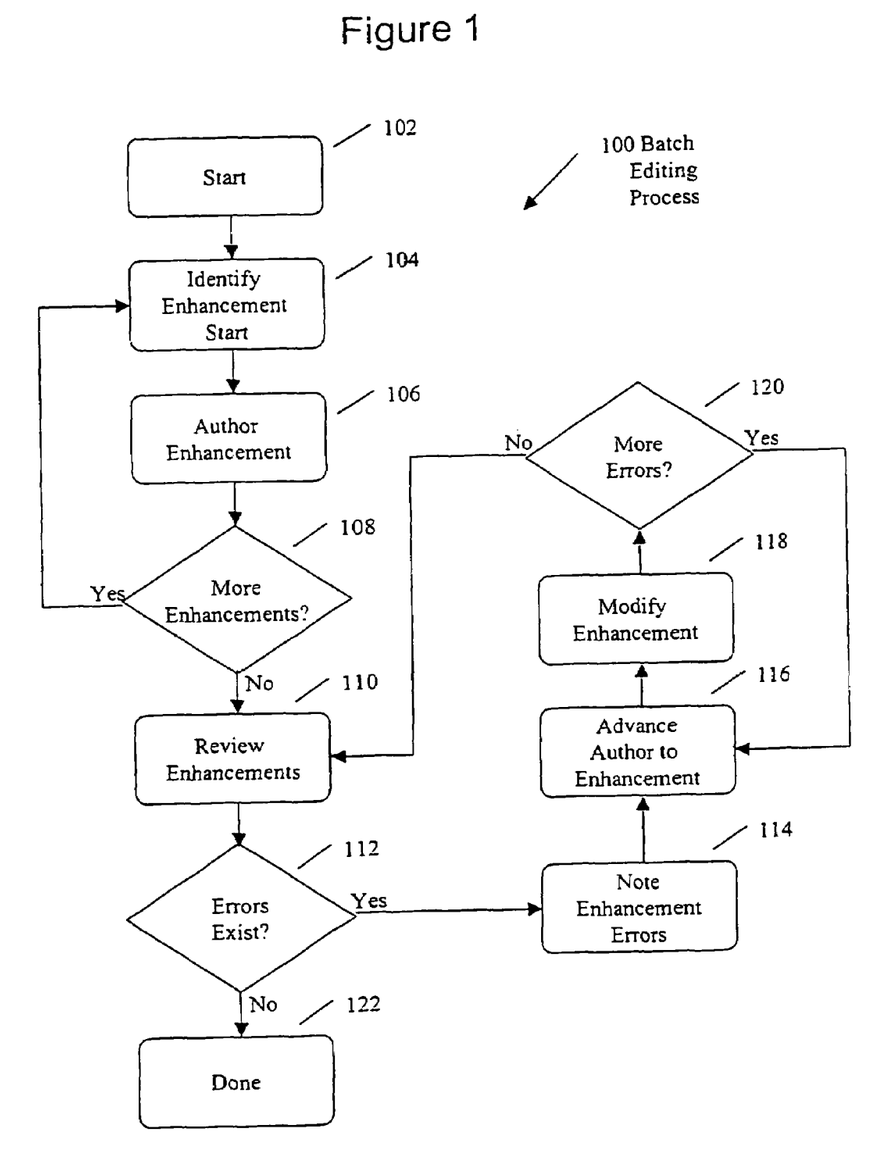
FIG. 1 depicts a batch editing process for streaming media enhancements.

FIG. 1 depicts a batch editing process for streaming media enhancements. Process 100 starts at step 102. At step 104, a streaming media file is advanced or positioned to a time or frame at which an enhancement display may commence. At step 106, enhancements are selected, placed in relation to a streaming media image, and their attributes specified. At step 108, a check is performed to determine if more enhancements are to be made. If more enhancements are to be made, processing continues at step 104. If the result of step 108 is that no additional enhancements exist, processing continues at step 110 where enhancements are reviewed. Review may involve transmitting an enhanced file across a network, such as a local TCP/IP network to emulate Internet transmission, for example, and viewing of the enhanced presentation. During review of enhancements, it is determined at step 112 if errors exist. If there are no errors, the process is completed at step 122. If it is determined at step 122 that errors exist, the nature of each error is noted in step 114. An enhancement editor is invoked, and at step 116 the media is advanced or positioned to the error. At step 118, the enhancement is modified to address the error. At step 120, a check is performed to determine if more errors exist. If it is determined at step 120 that more errors exist, processing continues at step 116. If it is determined at step 120 that no more errors exist, processing continues at step 110 where the corrected enhanced streaming media file is again reviewed. An iterative process may be performed employing steps 110 through 120 until all errors have been corrected.

The method of FIG. 1 is often a time consuming process and has the disadvatage that enancements are viewed at a later time than when created, requering the revierwer to recall the intention of the enhacement during the review proto determine if the desired result has been achieved. This may result in additional delay and may require that the reviewer consult a storyboard or other notation of desired content and effect. Futher, the batch nature of later reviewing corrections invokes similar disadvantages and requirements.

Figure 2:
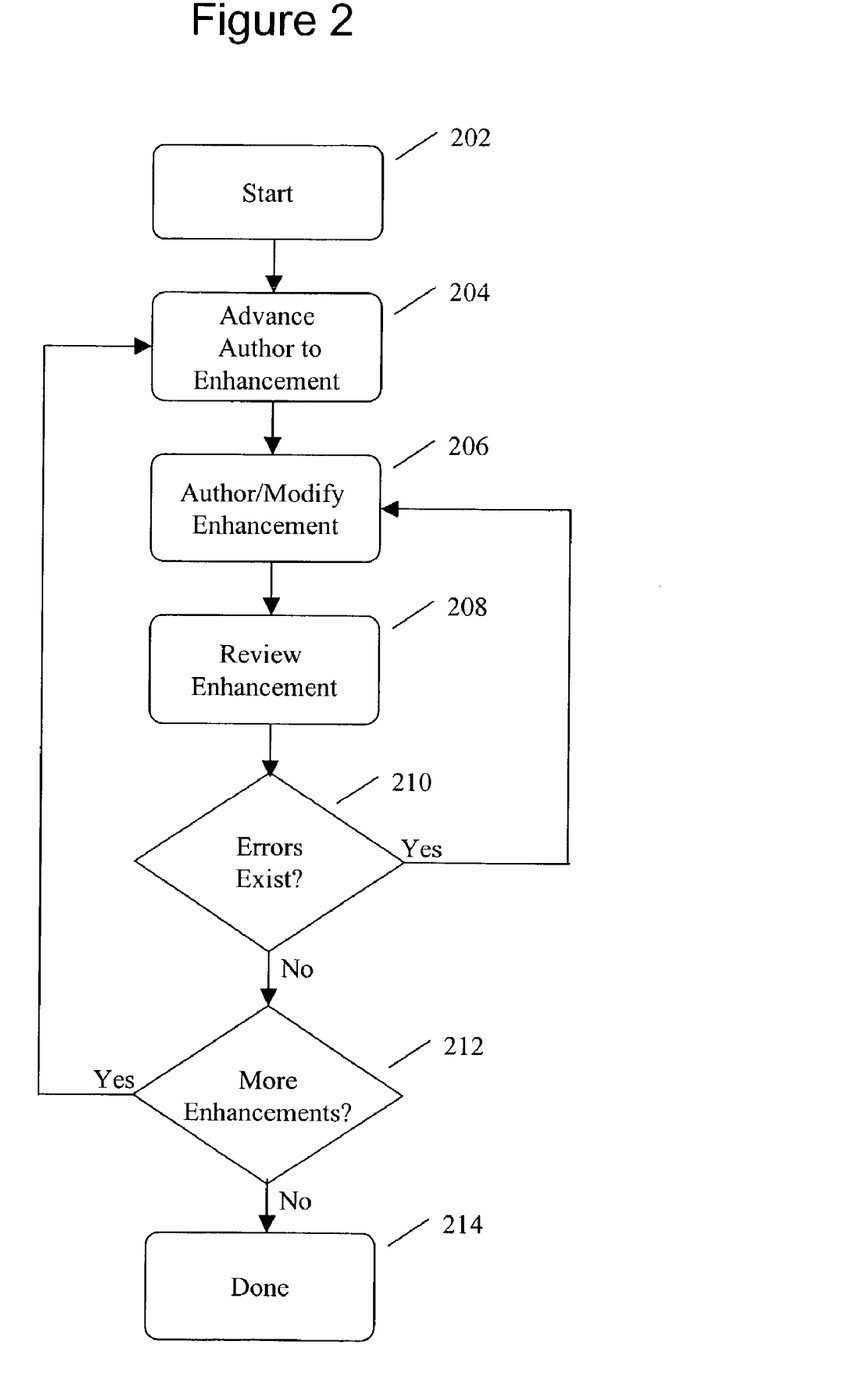
FIG. 2 depicts an interactive editing process for streaming media enhancements.

FIG. 2 depicts an interactive editing process for streaming media enhancements. Interactive process 200 starts at step 202. An authoring application or editor application may be launched. At step 204, a streaming media file is advanced or positioned to a time or frame at which an enhancement display may commence. The streaming media file may be moved forward or backward, allowing non-linear preview and editing. At step 206, enhancements are selected, placed in relation to a streaming media image, and their attributes specified. At step 208, the enhancement is reviewed employing the method of the present invention. At step 210, a check is performed to determine if errors exist in the reviewed enhancement. If it is determined at step 210 that errors do exist, processing continues at step 206 where the enhancement may be modified and then reviewed again at step 208. Creation and modification of enhancements may employ methods disclosed in parent application Ser. No. 09/941,246, entitled "METHOD OF ENHANCING STREAMING MEDIA CONTENT", filed Aug. 27, 2001 by Steven O. Markel.

If it is determined at step 210 that no errors exist for the enhancement, processing continues at step 212 where a check is performed to determine if more enhancements remain to be made. If it is determined at step 212 that there are more enhancements to be made, processing continues at step 204. If all enhancements have been made, processing completes at step 214. The process of FIG. 2 has the advantage that review is performed soon after an enhancement is created, reducing the need to consult notes or other information to determine the nature of an error or to determine the desired effect of the enhancement.

The present invention eliminates the need for network playback of an edited file by configuring a media player within a browser window to both present a streaming media file and to render authored enhancements. A browser window may comprise Internet Explorer from Microsoft Corporation, Netscape Navigator from Netscape Corporation, or other browsers. The media player may comprise Windows Media Player from Microsoft Corporation, or other media players.

Figure 3:
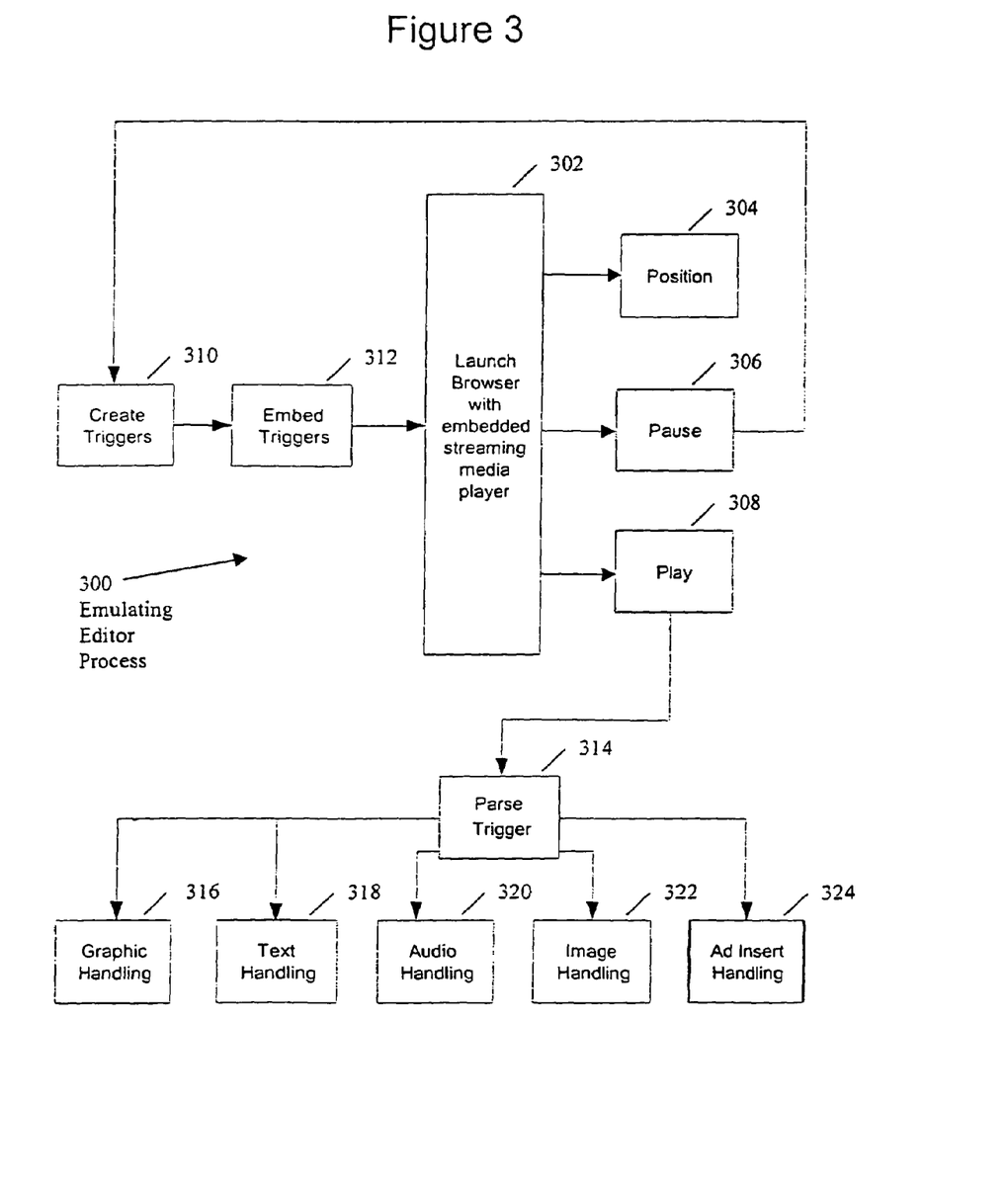
FIG. 3 is a diagram of an editing process employing the present invention.

FIG. 3 is a diagram of an editing process employing the present invention. Editing process 300 starts at step 302 with the launch of an authoring application comprising a browser with an embedded streaming media player. The authoring application may also launch a browser based enhancement parser program that may comprise shell JavaScript code, VBScript, or other code that operates within a browser environment. The browser based enhancement parser program allows triggers (later described) to be parsed and enhancements rendered. A streaming media filename and path is provided to the browser. From step 302, a user may select position control function 304, pause control function 306 and play control function 308. Position control function 304 may comprise employing fast forward and reverse controls, may comprise employing a user input function that allows specification or selection of a time or frame count of a streaming media file, or may comprise employing a search function to position a streaming media file relative to a value contained within the stream. For example, a search function may be employed to position a streaming media file to an enhancement by searching for trigger information or other identifying information. Position function 304 may also employ controls that allow the streaming media file to be forwarded or reversed by single or other specified numbers of frames or units of time.

Pause control function 306 may be employed to pause a streaming media presentation. A pause of the streaming media presentation may also be realized through use of other controls not depicted, such as a stop button for example, or through positioning functions provided through position control function 304. When the streaming media presentation is paused, a user (author) may create a trigger at step 310. A trigger may comprise a description of an enhancement, such as text, graphics, images or audio, for example, or may specify that a streaming media advertisement is to be played. At step 312, the trigger may be embedded in the streaming media file. Triggers may be pre-positioned and may specify a time, frame number, or other event indicative of when an enhancement is to be rendered. Pre-positioning allows sufficient time for generation or access of enhancement images and/or sounds prior to their rendering. Embedding may employ tools such as ASFCHOP and other tools that may be provided in content editing tools such as NetShow® from Microsoft Corporation of Redmond Wash.

Once an enhancement is embedded in the streaming media file, a user may employ play function 308 to view the enhancement. Play function 308 may call parse triggers function 314 that then may supply parameters to graphic handling function 316, text handling function 318, audio handling function 320, image handling function 322, and ad insert handling function 324. Parse triggers function 314 employs the browser based enhancement parser program to determine parameters. Graphic handling function 316 receives parsed trigger information identifying a graphic element generates browser graphics code that may comprise HTML code or any other code providing graphic display in conjunction with a media player. Similarly, text handling function 318 may receive parsed trigger information to identify a textual element and generates browser text code that may comprise HTML code or any other code providing text display in conjunction with a media player. Audio handling function produces browser audio code that may combine or replace audio of a streaming media file with enhancement audio. The aforementioned browser graphics code, browser text code and browser audio code are collectively termed browser enhancement code and are selectively generated depending on the parsed trigger information. Image handling function 322 may be employed to display images that may comprise formats such as JPEG, GIF, and other formats, allowing display of logos, maps and other information. Ad insert handling function 324 may receive parsed trigger information for streaming advertisement file information, and if found, may pause a streaming media presentation, open a separate window, show a streaming advertisement in the window, close the window, and then resume display of the streaming media presentation. Any of the rendered visual enhancements may include interactive access points (hotspots). During emulation the interactive access point may be activated by a mouse or other input device and the software routine corresponding to the interactive access point executed or details thereof provided. For example, accessing an interactive access point corresponding to a web link may result in the URL of the web link being displayed.

Figure 4:
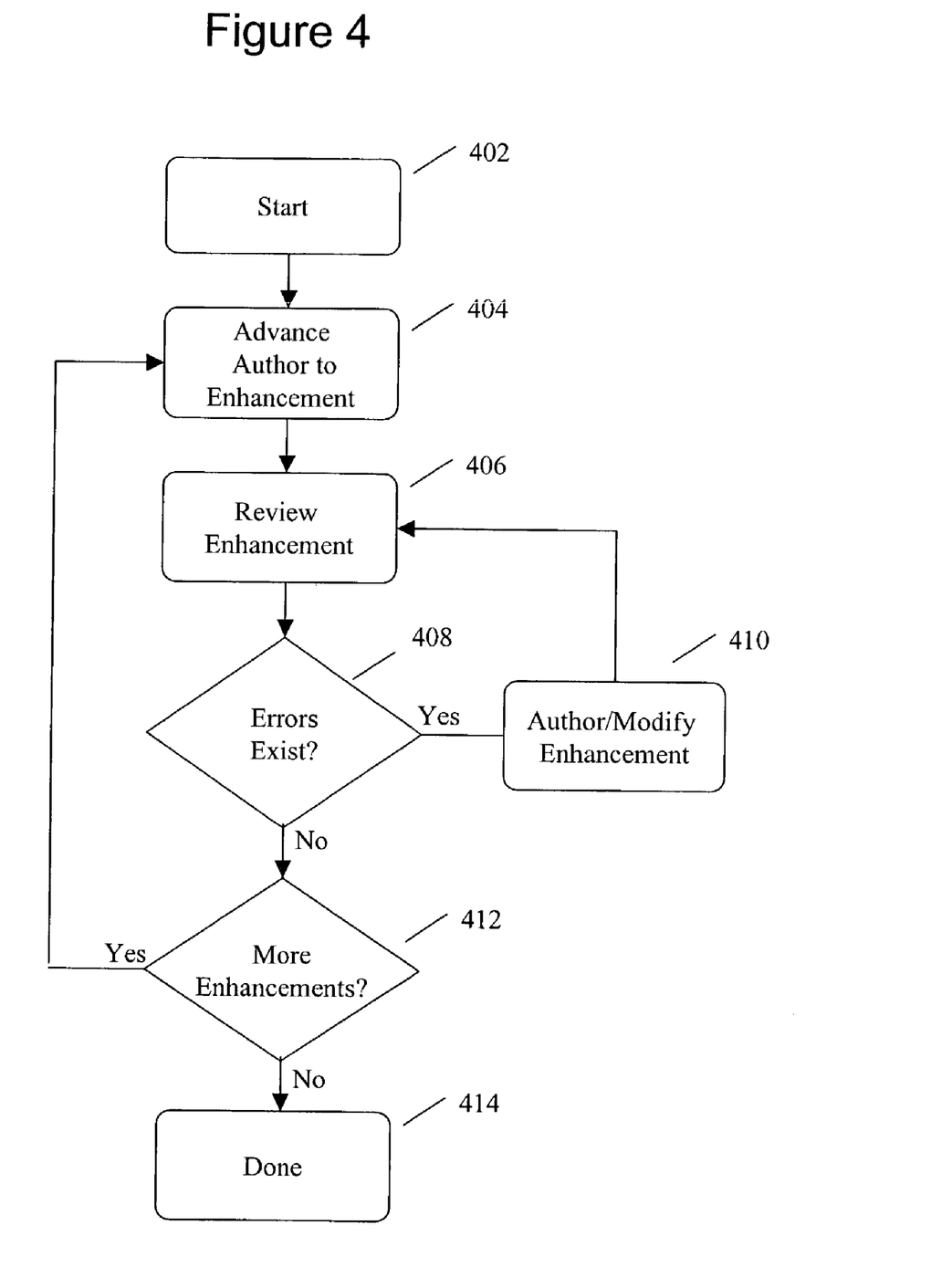
FIG. 4 depicts an interactive preview process for streaming media enhancements.

FIG. 4 depicts an interactive preview and editing process for streaming media enhancements. Interactive process 400 starts at step 402 where a browser window is opened containing a media player, an authoring application or editor application, and a browser based enhancement parser. At step 404, a streaming media file may be advanced or positioned to a time or frame at which an enhancement display may commence. The streaming media file may be moved forward or backward, allowing non-linear preview and editing. Positioning of the streaming media file may also employ searching forward or backward (or within a specified time range) for enhancement information. After an enhancement streaming media file position is selected, at step 406, an enhancement is previewed employing the method of the present invention. At step 408 a check is performed to determine if errors exist. If an error exists, processing continues at step 410 where existing enhancements may be modified or deleted and new enhancements may be added. Editing and creation of enhancements may employ methods disclosed in parent application Ser. No. 09/941,246, entitled "METHOD OF ENHANCING STREAMING MEDIA CONTENT", filed Aug. 27, 2001 by Steven O. Markel. Processing then continues at step 406 where the enhancement(s) are again previewed. If the check performed at step 408 determines that no errors exist, processing continues at step 412

If it is determined at step 408 that no errors exist for the enhancement, processing continues at step 412 where a check is performed to determine if more enhancements remain to be previewed. If it is determined at step 412 that there are more enhancements to be made, processing continues at step 404. If all enhancements have been made, processing completes at step 414. The process of FIG. 4 has the advantage that review is performed quickly and that corrections may be made as there are discovered, reducing the need to consult notes or other information to determine the nature of an error or to determine the desired effect of the enhancement.

Appendix A provides a code example for implementing functions for one embodiment of the present invention. A media player is embedded in a browser window. JavaScript code parses triggers to extract enhancement information. Extracted parameters are employed to generate HTML code operable to render the enhancement. Other embodiments may employ different software formats, may employ browser plug-ins or stand-alone software programs, and may employ publicly available or proprietary software routines for display of streaming media files, parsing of enhancement information, and rendering of enhancements.

Advantageously, the present invention provides a system and method by which authored enhancements may be previewed as they are developed without requiring a network connection. Should an error be observed, such as caption misspelling, incorrect graphic position, or incorrect URL, for example, the preview may be stopped, the trigger modified, and a modified streaming media file with the modified trigger embedded within may be played and again be previewed. Once all enhancements have been authored, previewed and corrected if necessary, the modified streaming media file may be saved.

The foregoing description of the invention has been presented for purposes of illustration and description. It is not intended to be exhaustive or to limit the invention to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

APPENDIX A

Javascript Code Example

```
<html>
<head>
<meta NAME="GENERATOR" Content="Microsoft Visual Studio 6.0">
<script LANGUAGE="javascript">
<!--
/*
  utility: extract various params from triggers // (Figure 3 - step 314)
*/
function parse(tParam, vStr) {
   var p0, pf;
   p0 = tParam.indexOf(vStr)
   if(p0 == -1) return -1;
   pf = tParam.indexOf(",", p0)
   if(pf == -1) {
      return tParam.slice(p0 + vStr.length);
      }
   else {
      return tParam.slice(p0 + vStr.length, pf);
      }
   }
//-->
</script>
<script Language="JavaScript" FOR="wmp" EVENT="ScriptCommand
(trType,trParam)">
<!--
   var param = new String(trParam);
   var pTop = parse(param, "top=");
   var pLeft = parse(param, "left=");
```

APPENDIX A-continued

Javascript Code Example

```
    var pSrc = parse(param, "src=");
    var pURL = parse(param, "url=");
    var pEID = parse(param, "eid=");
    var pVis = parse(param, "vis=");
    var pFont = parse(param, "font=");
    var pSize = parse(param, "size=");
    var pColor = parse(param, "color=");
    var pBold = parse(param, "bold=");
    var pUL = parse(param, "ul=");
    var pItalic = parse(param, "italic=");
    if(pSrc == "") pSrc =-1;
    if(pVis == "") pVis =-1;
    if(pFont == "") pFont =-1;
    if(pSize == "") pSize =-1;
    if(pColor == "") pColor =-1;
//adjust top and left realizing that the preview wmp has resized itself
    pTop -= 15;
    pLeft -= 5;
    pTop = pTop * wmp.clientHeight / 252;
    pLeft = pLeft * wmp.clientWidth / 168;
    var e="";
    var o;
    if(window.divPg.innerHTML.indexOf("id=dv" + pEID) > -1)
    {   //exists already
       if(pTop != -1) {
          o = eval("window.dv" + pEID);
          o.style.posTop = pTop;
       }
       if(pLeft != -1) {
          o = eval("window.dv"+ pEID);
          o.style.posLeft = pLeft;
       }
       if(pSrc !=-1) {
          if(trType == "Caption") {
             o = eval("window.ac" + pEID);
             o.innerText = pSrc;
          }
          if(trType == "Graphic") {
             o = eval("window.im" + pEID);
             o.src = pSrc;
          }
       }
       if(pURL != -1) {
          o = eval("window.ac" + pEID);
          o.href = pURL;
       }
       if(pVis != -1) {
          o = eval("window.dv" + pEID);
          if(pVis == 0) {
             o.style.visibility = "hidden";
          }
          if(pVis == 1) {
             o.style.visibility = "visible";
          }
       }
       if(pFont != -1) {
          o = eval("fontID" + pEID);
          o.face = pFont;
       }
       if(pSize != -1) {
          o = eval("fontID" + pEID);
          o.size = sizeFont(pSize);
       }
       if(pColor != -1) {
          o = eval("fontID" + pEID);
          o.color = toHex(pColor);
       }
       if(pUL != -1) {
       }
          if(pBold != -1) {
       }
          if(pItalic != -1) {
       }
    }
    else {       //insert new element
       if(pURL == -1) pURL = "";
       switch (trType) {    //warning: these strings must match exactly
```

APPENDIX A-continued

Javascript Code Example

```
with trigger strings
       case "Caption":  //build HTML string for text
          e = ''
          //if(pBold==1)
             e += '<b id="boldID' + pEID + '">';
          if(pUL==1) e += '<u id="ulID' + pEID + '" >';
          if(pItalic==1) e += '<i id="italicID' + pEID + '">';
          e += '<font id="fontID' + pEID + '" face="' + pFont + '"
size="' + sizeFont(pSize) + '" color="' + pColor + '">';
          e += '<a id="ac' + pEID + '" href="' + pURL + '"
target="_blank">';
          e += pSrc;
          e += '</a>';
          e += '</font>'
          if(pItalic==1) e += '</i>';
          if(pUL==1) e += '</u>';
          if(pBold==1) e += '</b>';
          break;
       case "Graphic": // build HTML for graphic element
          e = '<a id="ac' + pEID + '" href="' + pURL + '"
target="_blank">' + '<img border="0" id="im' + pEID
+ '" SRC="' + pSrc + '">' + '</a>';
          break;
       default:
       }
       var d = '<div id="dv' + pEID + '" style="position:
          absolute; left: ' + pLeft +
';top: ' + pTop + '; z-index: ' + 10 +'">' + e + '</div>';
          window.divPg.innerHTML += d;
       }
// -->
</script>
<script ID="clientEventHandlersJS" LANGUAGE="javascript">
<!--
function MakeHexArray( ) {
   this.length = 16;
   for (var i = 1; i <= 10; i++) this[i] = i-1;
   this[11]=" A "; this[12]="B"; this[13]="C"; this[14]="D"; this[15]="E";
this[16]="F";
   return this
}
function toHex(color) {
   var digit, hexDigit, theColor=color, hexColor="";
   hex = new MakeHexArray( );
   for(var i=0; i<6; i++) {
      digit = theColor &15;
      hexDigit = hex[digit+ 1];
      hexColor = hexDigit + hexColor;
      theColor = theColor >> 4;
   }
   hexColor = "#" + hexColor;
}
function window_onload( ) {
// wmp.FileName = "c:/temp/test13.asf";
   wmp.FileName="<%=request.querystring("asf")%>";
   wmp.AutoStart = true;
   wmp.AutoSize = false;
   wmp.width = screen.width;
   wmp.height = screen.height;
   wmp.DisplaySize = 4;
}
function wmp_EndOfStream( ) {
   window.divPg.innerHTML="";
   window.opener.wmp1.Play( );
   window.close( );
}
function window_onresize( ) {
}
function sizeFont(inSize) {
   if(inSize < 8) return "1";
   if(inSize < 10) return "2";
   if(inSize < 12) return "3";
   if(inSize < 14) return "4";
   if(inSize < 18) return "5";
   if(inSize < 24) return "6";
   if(inSize < 36) return "7";
}
```

APPENDIX A-continued

Javascript Code Example

```
function window_onblur( ) {
   if(window.wmp.PlayState == 2) window.wmp.Pause( );
   }
function window_onfocus( ) {
   window.focus( );
   if(window.wmp.PlayState == 1) window.wmp.Play( );
   }
//-->
</script>
<SCRIPT LANGUAGE=javascript FOR=wmp EVENT=EndOfStream>
<!--
wmp_EndOfStream( )
//-->
</SCRIPT>
</head>
<BODY LANGUAGE=javascript onload="return
window_onload( )" onblur="return
window_onblur( )" onfocus="return window_onfocus( )">
<OBJECT id=wmp style="LEFT: 0px;
TOP: 0px" classid="clsid:22D6F312-B0F6-
11D0-94AB-0080C74C7E95">   //parameters for player setup
   <PARAM NAME="AudioStream" VALUE="-1">
   <PARAM NAME="AutoSize" VALUE="0">
   <PARAM NAME="AutoStart" VALUE="-1">
   <PARAM NAME="AnimationAtStart" VALUE="-1">
   <PARAM NAME="AllowScan" VALUE="-1">
   <PARAM NAME="AllowChangeDisplaySize" VALUE="-1">
   <PARAM NAME="AutoRewind" VALUE="0">
   <PARAM NAME="Balance" VALUE="0">
   <PARAM NAME="BaseURL" VALUE="">
   <PARAM NAME="BufferingTime" VALUE="5">
   <PARAM NAME="CaptioningID" VALUE="">
   <PARAM NAME="ClickToPlay" VALUE="-1">
   <PARAM NAME="CursorType" VALUE="0">
   <PARAM NAME="CurrentPosition" VALUE="-1">
   <PARAM NAME="CurrentMarker" VALUE="0">
   <PARAM NAME="DefaultFrame" VALUE="">
   <PARAM NAME="DisplayBackColor" VALUE="0">
   <PARAM NAME="DisplayForeColor" VALUE="16777215">
   <PARAM NAME="DisplayMode" VALUE="0">
   <PARAM NAME="DisplaySize" VALUE="3">
   <PARAM NAME="Enabled" VALUE="-1">
   <PARAM NAME="EnableContextMenu" VALUE ="-1">
   <PARAM NAME="EnablePositionControls" VALUE="-1 ">
   <PARAM NAMF="EnableFullScreenControls" VALUE="0">
   <PARAM NAME="EnableTracker" VALUE="-1">
   <PARAM NAME="Filename" VALUE="">
   <PARAM NAME="InvokeURLs" VALUE="-1">
   <PARAM NAME="Language" VALUE="-1">
   <PARAM NAME="Mute" VALUE="0">
   <PARAM NAME="PlayCount" VALUE="1">
   <PARAM NAME="PreviewMode" VALUE="0">
   <PARAM NAME="Rate" VALUE="1">
   <PARAM NAME="SAMILang" VALUE="">
   <PARAM NAME="SAMIStyle" VALUE="">
   <PARAM NAME="SAMIFileName" VALUE="">
   <PARAM NAME="SelectionStart" VALUE="-1">
   <PARAM NAME="SelectionEnd" VALUE="-1">
   <PARAM NAME="SendOpenStateChangeEvents" VALUE="-1">
   <PARAM NAME="Send WarningEvents" VALUE="-1">
   <PARAM NAME="SendErrorEvents" VALUE="-1">
   <PARAM NAME="SendKeyboardEvents" VALUE="0">
   <PARAM NAME="SendMouseClickEvents" VALUE="0">
   <PARAM NAME="SendMouseMoveEvents" VALUE="0">
   <PARAM NAME="SendPlayStateChangeEvents" VALUE="-1">
   <PARAM NAME="ShowCaptioning" VALUE="0">
   <PARAM NAME="ShowControls" VALUE="0">
   <PARAM NAME="ShowAudioControls" VALUE="-1">
   <PARAM NAME="ShowDisplay" VALUE="0">
   <PARAM NAME="ShowGotoBar" VALUE="0">
   <PARAM NAME="ShowPositionControls" VALUE="0">
   <PARAM NAME="ShowStatusBar" VALUE="0">
   <PARAM NAME="ShowTracker" VALUE="0">
   <PARAM NAME="TransparentAtStart" VALUE="0">
   <PARAM NAME="VideoBorderWidth" VALUE="0">
   <PARAM NAME="VideoBorderColor" VALUE="0">
   <PARAM NAME="VideoBorder3D" VALUE="0">
```

APPENDIX A-continued

Javascript Code Example

```
   <PARAM NAME="Volume" VALUE="-600">
   <PARAM NAME="WindowlessVideo" VALUE="0"></OBJECT>
</BODY>
<div style="position: absolute; left: 0; top: 0" id="divPg">
</div>
</body>
</html>
```

What is claimed is:

1. A method of editing and reviewing an enhanced streaming media presentation without transmitting the streaming media presentation over a network, said method comprising:

opening a browser window containing an embedded media player, an editor application, and a browser based enhancement parser program in a graphical user environment;

configuring a media player within said browser window to present a streaming media file and to render authored enhancements;

opening an enhanced streaming media file containing enhancement information in said browser window;

playing said enhanced streaming media file in said browser window;

parsing said enhanced streaming media file using said browser based enhancement parser program to extract said enhancement information;

selecting said extruded enhancement information;

employing a search function to position said enhanced streaming media file to a determined position;

placing said selected enhancement information at said determined position in the streaming media file to create an edited enhancement in the streaming media file;

reviewing said edited enhancement in the streaming media file to determine if the edited enhancement at the determined position in the streaming media file is correct;

generating edited browser enhancement code in said browser window using said browser based enhancement parser program employing said reviewed edited enhancement; and executing said edited browser enhancement code within said browser window to render an enhancement.

2. The method as set forth in claim 1 where said step of parsing further comprises:

identifying a trigger in said enhancement information that specifies when said enhancement is to be rendered.

3. The method as set forth in claim 2 where said step of executing said browser enhancement code further comprises:

executing said browser enhancement code at a time that corresponds to said enhancement information that specifies when said enhancement is to be rendered.

4. The method as set forth in claim 1 further comprising:

identifying an advertisement trigger in said enhancement information;

pausing said streaming media presentation;

rendering an advertisement indicated by said advertisement trigger; and resuming play of said streaming media presentation.

5. The method as set forth in claim 1 where said step of playing further comprises:

positioning said enhanced streaming media file to a position that contains enhancement information.

6. The method as set forth in claim 1 further comprising:
editing said enhancement information to produce edited enhancement information;
repositioning said enhanced streaming media file to a position corresponding to the edited enhancement information; and
rendering said enhanced streaming media file with said edited enhancement information.

7. The method as set forth in claim 6 further comprising:
saving said edited enhancement information in said enhanced streaming media file.

8. The method as set forth in claim 1 where said enhanced streaming media file is a platform independent file.

* * * * *

UNITED STATES PATENT AND TRADEMARK OFFICE
CERTIFICATE OF CORRECTION

| | | |
|---|---|---|
| PATENT NO. | : 7,526,723 B2 | Page 1 of 1 |
| APPLICATION NO. | : 10/347656 | |
| DATED | : April 28, 2009 | |
| INVENTOR(S) | : Markel | |

It is certified that error appears in the above-identified patent and that said Letters Patent is hereby corrected as shown below:

In column 10, line 32, in Claim 1, delete "extruded" and insert -- extracted --, therefor.

Signed and Sealed this

First Day of September, 2009

David J. Kappos
*Director of the United States Patent and Trademark Office*